US008289315B2

(12) United States Patent
Kondo et al.

(10) Patent No.: US 8,289,315 B2
(45) Date of Patent: Oct. 16, 2012

(54) IMAGE SIGNAL GENERATING APPARATUS, IMAGE SIGNAL GENERATION METHOD, COMPUTER PROGRAM, AND RECORDING MEDIUM

(75) Inventors: Tetsujiro Kondo, Tokyo (JP); Ryotaku Hayashi, Saitama (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 12/391,743

(22) Filed: Feb. 24, 2009

(65) Prior Publication Data
US 2009/0251458 A1 Oct. 8, 2009

(30) Foreign Application Priority Data
Apr. 7, 2008 (JP) ................................. 2008-099567

(51) Int. Cl.
*G06F 17/00* (2006.01)
*H04N 9/12* (2006.01)
(52) U.S. Cl. ........................................ 345/418; 348/383
(58) Field of Classification Search .................... 348/383
See application file for complete search history.

(56) References Cited

U.S. PATENT DOCUMENTS

| 4,479,784 | A | * | 10/1984 | Mallinson et al. | ............... 434/43 |
| 5,767,893 | A | * | 6/1998 | Chen et al. | ................... 725/119 |
| 5,828,809 | A | * | 10/1998 | Chang et al. | .................. 386/241 |
| 7,071,990 | B2 | | 7/2006 | Kondo | |
| 2004/0102713 | A1 | * | 5/2004 | Dunn | ............................ 600/558 |
| 2005/0240957 | A1 | * | 10/2005 | Tsunokawa et al. | ............ 725/20 |
| 2007/0281812 | A1 | * | 12/2007 | Smith et al. | ................... 473/604 |

FOREIGN PATENT DOCUMENTS
JP 2003-198989 7/2003
* cited by examiner

*Primary Examiner* — Kee M Tung
*Assistant Examiner* — Sing-Wai Wu
(74) *Attorney, Agent, or Firm* — Oblon, Spivak, McClelland, Maier & Neustadt, L.L.P.

(57) ABSTRACT

An image signal generating apparatus is provided. The apparatus includes a sight-line detecting unit, a peripheral image determination unit, and an image processing unit. The sight-line detecting unit detects a sight line of a user looking at images of a plurality of contents displayed on a display unit. The peripheral image determination unit determines an image located in a user's peripheral viewing field as a peripheral image in the images of the plurality of contents based on the sight line detected by the sight-line detecting unit. The image processing unit adds an object representing an attribute of a content of the peripheral image determined by the peripheral image determination unit to an image signal for displaying the images of the plurality of contents.

11 Claims, 14 Drawing Sheets

| LIST NAME | CLASSIFICATION ITEM | COLOR |
|---|---|---|
| LIST 2 | VARIETY PROGRAM | RED |
|  | QUIZ SHOW PROGRAM | YELLOW |
|  | MUSIC PROGRAM | GREEN |
|  | ... | ... |

| LIST NAME | CLASSIFICATION ITEM | COLOR |
|---|---|---|
| LIST 1 | REPORT PROGRAM | RED |
|  | ENTERTAINMENT PROGRAM | YELLOW |
|  | SPORTS PROGRAM | GREEN |
|  | ... | ... |

181 — LIST NAME
182 — CLASSIFICATION ITEM
183 — COLOR

IMAGE SIGNAL GENERATING APPARATUS, IMAGE SIGNAL GENERATION METHOD, COMPUTER PROGRAM, AND RECORDING MEDIUM

BACKGROUND OF THE INVENTION

1. Field of the Invention

The present invention relates to an image signal generating apparatus, a method of generating an image signal, a computer program for executing such a method, and a recording medium storing such a computer program, and particularly relates to a technology to be applied when displaying a plurality of images being arranged using any one of the image signal generating apparatus, the method of generating an image signal, the computer program, and the recording medium.

2. Description of the Related Art

In recent years, a display system, such as a multiple display system with a plurality of display devices, has been used for simultaneously displaying a plurality of images or divided parts of an image on the respective display devices. In addition, even in the case of displaying images only on a single display device, the display screen of the display device can be divided into two or more screen areas and display two or more images arranged thereon. Thus, a multi-functional display can be realized by simultaneously displaying a plurality of images arranged.

Japanese Unexamined Patent Application Publication No. 2003-198989 discloses an example of display system which can display an enlarged image by a plurality of display devices.

SUMMARY OF THE INVENTION

The human's field of view (viewing field) includes two types of vision: "central vision" and "peripheral vision". The "central vision" is a field near the center point of the human's viewing field and discriminates figures, colors, and so on in detail. In contrast, the "peripheral vision" is a periphery of the central vision field, and the perceptive abilities thereof are inferior compared with the central vision. Therefore, when a user simultaneously watches images displayed on a plurality of screens, the user can recognize data about an image at which the user is gazing, but not sufficiently recognize the detailed data about the surrounding images. Hereinafter, the range of viewing field, which can be recognized by the peripheral vision of the user, is referred to a "peripheral viewing field".

Thus, when simultaneously displaying images of a plurality of contents, the user watching the images may not recognize a kind of content an image of which is displayed on each screen at a glance. Therefore, there is a disadvantage in that the user takes much time to search the content of interest. In addition, the user may fail to obtain data because of taking much time to search the content of interest.

It is desirable to provide an image signal generating apparatus, a method of generating an image signal, a computer program, and a recording medium, where the user can efficiently acquire desired data using each of them that prevents the user from failing to take such data, when images of a plurality of contents are displayed simultaneously.

According to an embodiment of the present invention, there is provided an image signal generating apparatus. The apparatus includes a sight-line detecting unit, a peripheral image determination unit, and an image processing unit. The sight-line detecting unit is configured to detect a sight line of a user who is looking at images of a plurality of contents displayed on a display unit. The peripheral image determination unit is configured to determine an image located on the user's peripheral viewing field as a peripheral image in the images of the plurality of contents based on a sight line detected by the sight-line detecting unit. The image processing unit is configured to add an object representing an attribute of a content of the peripheral image determined by the peripheral image determination unit to an image signal for displaying the images of the plurality of contents. According to the embodiment, the object added to the image signal is a colored object with a color corresponding to an attribute of the content.

According to the embodiment of the present invention, therefore, when the user is watching images of a plurality of contents being displayed simultaneously, the attribute of a content can be informed to the user by superimposing and displaying an object, corresponding to the attribute of the content being displayed, on the image of the content.

According to the embodiment of the present invention, when the user is watching images of a plurality of contents being displayed simultaneously, the user can readily recognize the attribute of a content by displaying an object corresponding to the attribute of the content being displayed on the peripheral viewing field of the user.

Furthermore, the object to be displayed may be a colored object with a color corresponding to the attribute of the content. Thus, data in the user's peripheral viewing field can be recognized at a glance and the user may need not discriminate a fine pattern or the like. As a result, the user can search for a content to watch in a short time, while being prevented from failing to take data, and efficiently acquiring the desired data.

BRIEF DESCRIPTION OF THE DRAWINGS

FIG. 3 is an explanation diagram illustrating an example data configuration of an attribute list according to an embodiment of the present invention.

DESCRIPTION OF THE PREFERRED EMBODIMENTS

Hereafter, embodiments of the present invention will be described with reference to accompanying drawings.

Figure 1:
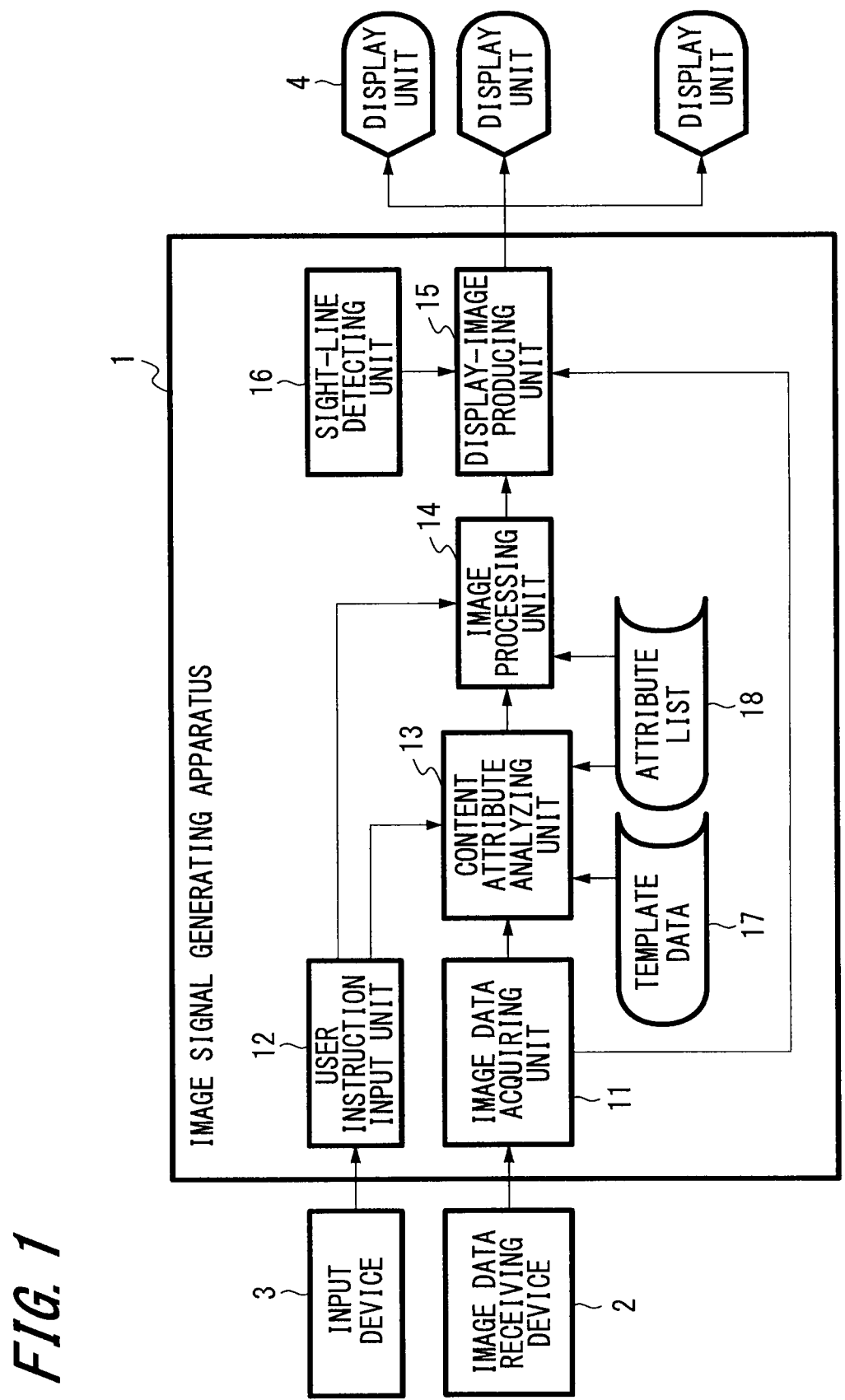
FIG. 1 is a block diagram illustrating an example configuration of an image signal generating apparatus according to an embodiment of the present invention.

FIG. 1 is a block diagram illustrating an example configuration of an image signal generating apparatus 1. The image signal generating apparatus 1 includes an image data acquiring unit 11 and a user instruction input unit 12. The image data acquiring unit 11 acquires an image signal, an audio signal, and so on from an image data receiving device 2, such as a tuner. The user instruction input unit 12 receives data selected and instructed by the user through an input device 3 such as a keyboard or a remote controller.

The image signal generating apparatus 1 further includes a content attribute analyzing unit 13, an image processing unit 14, a display-image producing unit 15, and a sight-line detecting unit 16. In addition, the image signal generating apparatus 1 includes two or more display units 4 to display image signals generated by the display-image producing unit 15.

In this example, the image data acquiring unit 11 acquires data about images of a plurality of contents to be displayed on the respective display units 4 and then the content attribute analyzing unit 13 analyzes the attributes of the respective contents from the acquired data. In other words, the content attribute analyzing unit 13 analyzes content attributes based on data about image signals, audio signals, EPG (Electronic Program Guide), and so on. Thus, the categories of the contents, attributes thereof such as performers, and so on can be extracted from the data and then classified. Next, the image processing unit 14 determines a color of each object to be superimposed and displayed on the image of the content on the basis of the results of the analysis carried out by the content attribute analyzing unit 13. Subsequently, the display-image producing unit 15 estimates a peripheral viewing field based on the user's sight-line data detected by the sight-line detecting unit 16, determines an image located in a peripheral viewing field, and determines the display position of an object based on the determination. Finally, the display-image producing unit 15 superimposes the determined colored object on an image signal supplied from the image data acquiring unit 11, followed by displaying the object on the display units 4.

Figure 2:
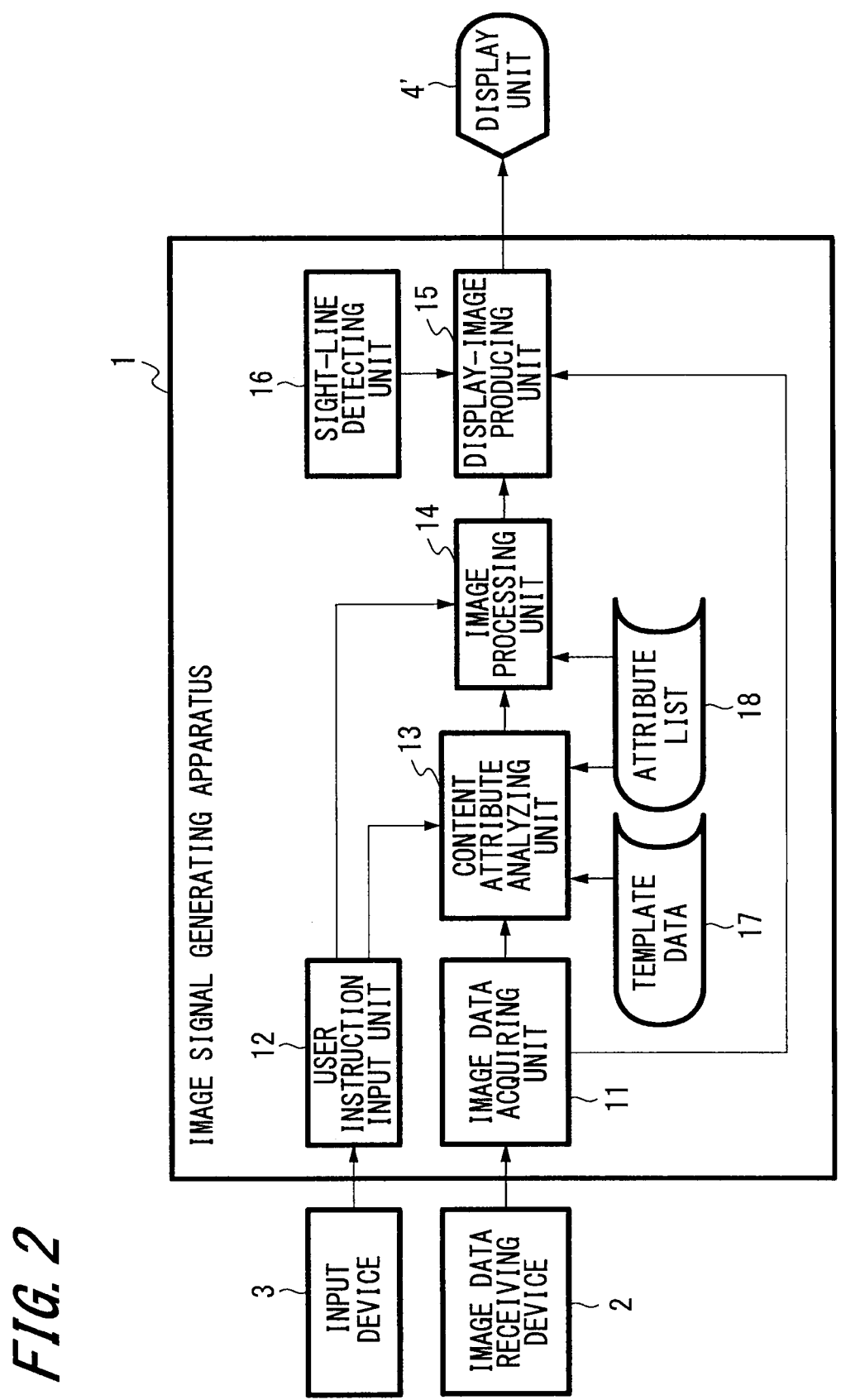
FIG. 2 is a block diagram illustrating another example configuration of an image signal generating apparatus according to an embodiment of the present invention.

Although two or more display devices are used as display units 4 in FIG. 1, the image signal generating apparatus 1 may alternatively be provided with a single display device as a display unit 4' as shown in FIG. 2. In this case, the display screen of the display device may be divided to display two or more images side by side at a time.

Next, processing carried out in each unit will be described.

The user instruction input unit 12 acquires data selected and instructed by the user through the input device 3 such as a keyboard or a remote controller. In this example, the attribute of content is analyzed and classified. The user viewing an image and listening to audio can set a desired classification using the input device 3. If classification is made on the basis of the type of broadcast program, the content may be classified roughly into categories, such as report program/entertainment program/sports program, or categories in detail, such as variety program/quiz show program/music program. In addition, there are other classifications, for example, one based on the name of performer, such as performer A/performer B/performer C, and one based on the generation of televiewers, such as 10's males/20's females being assumed by the maker. In this example, the data about classification of contents is registered as an attribute list 18 and the user selects and uses desired data about classification. Furthermore, the user may input and set optional classification data through the keyboard or the like in addition to data on classifications set in advance. The attribute list 18 will be described later in detail.

The content attribute analyzing unit 13 analyzes image signals, audio signals, and EPG or other broadcast program data of the content acquired by the image data acquiring unit 11 and then classifies the attribute of the content according to the classification directed by the user through the user instruction input unit 12. Content attribute analyzing processing includes image analyzing, audio analyzing, EPG analyzing, and so on. In the image analyzing and audio analyzing, template data 17 registered in advance is used for the attribute analyzing and characteristics of the content are extracted by being compared with the template or the like. Subsequently, the attribute of the content is analyzed based on the extracted results of the characteristics. In the EPG analyzing, keywords are extracted based on the data about the name of broadcast program or performer, or the like included in the EPG, and the attribute of the content is analyzed based on the extracted results. The keywords are then analyzed based on the results of the extraction. Each analyzing processing will be described below.

In the image analyzing, matching processing is carried out in which the image signal of a template image provided for attribute analyzing and the image signal of a target image to be analyzed are compared to extract characteristics. The matching processing for image signals may be, for example, carried out by comparing all pixels with each other or comparing the histograms of luminance. Such processing determines classification characteristics that the analyzing target image has by calculating the degree of coincidence between the template image for a certain classification and the target image. In addition, the image analyzing is carried out for each frame of an image signal repetitively at a predetermined cycle of one frame, ten frames, or the like.

In the audio analyzing, words are estimated by audio recognition based on HMM (Hidden Markov Model) and a comparison is made with the template audio provided for attribute analyzing. The degree of coincidence with the template audio for a certain classification is calculated, thereby determining classification characteristics that the analyzing target audio has. In the audio analyzing, an audio signal is divided into sections of a predetermined period of time and the processing of estimating words from the audio signal within the period of time is repeated.

In the EPG analyzing, first, keyword data for the attribute analyzing is registered in the template data 17 for each classification in advance. The keyword of the content is extracted from the program data such as EPG that is the target of the analyzing, and compared with the registered keyword provided for the attribute analyzing. The degree of coincidence with the keyword of a certain classification is calculated, thereby determining classification characteristics that the keyword of the analyzing target content has.

The service provider of the image signal generating apparatus 1 of the present embodiment resisters in advance the image and audio template data, the data about keywords for the EPG analyzing, or the like as the template data 17. In addition, the user may also specify a certain image or audio from a content considered well representing the characteristics of the attribute desired to be classified and register the image or audio as template data. Furthermore, a plurality of image signal generating apparatuses 1 of the present embodiment can be connected to one another through network. In that case, shared template data is registered in the area accessible from each device on the network. Data required for the matching processing by the content attribute analyzing unit 13 can also be used with reference to the shared template data. With such configuration, the template data for the attribute analyzing can be shared with other users and the template more suitable for the attribute analyzing can be thus selected. As heretofore described, the template data and the data about a keyword and so on of any mode may be registered so long as it can be referred when the processing by the content attribute analyzing unit 13 is carried out.

The image processing unit 14 determines the color of object, which is superimposed and displayed on the image of the content, with reference to the attribute list 18 corresponding to the classification of the content directed by the user based on the result of analyzing by the content attribute analyzing unit 13. Objects superimposed on the images of contents and displayed include, for example, an object for color-coded display on a display screen with a frame and an object for color-coded display on a display screen with the symbol of a specific shape. Alternatively, any other mode of applying object may be used so long as the object can be identified with color.

The display-image producing unit 15 superimposes based on the output of the image processing unit 14 a colored object on an image signal supplied from the image data acquiring unit 11, followed by displaying the resultant image on the display units 4. The display position of the object superimposed is determined based on a peripheral viewing field that is estimated with reference to the user's sight line detected by the sight-line detecting unit 16.

FIG. 3 represents an example of data configuration of the attribute list 18. The attribute list 18 includes a plurality of lists (Ln) defined corresponding to respective classifications of content. The attribute list 18 includes the data of list name 181 that represents the classification, classification item 182 that defines the category of program to be classified, and color 183 that defines the color of an object displayed. When the user specifies the desired classification, the attribute list 18 corresponding thereto is selected and referenced in the processing carried out by the content attribute analyzing unit 13 and the image processing unit 14.

Figure 4:
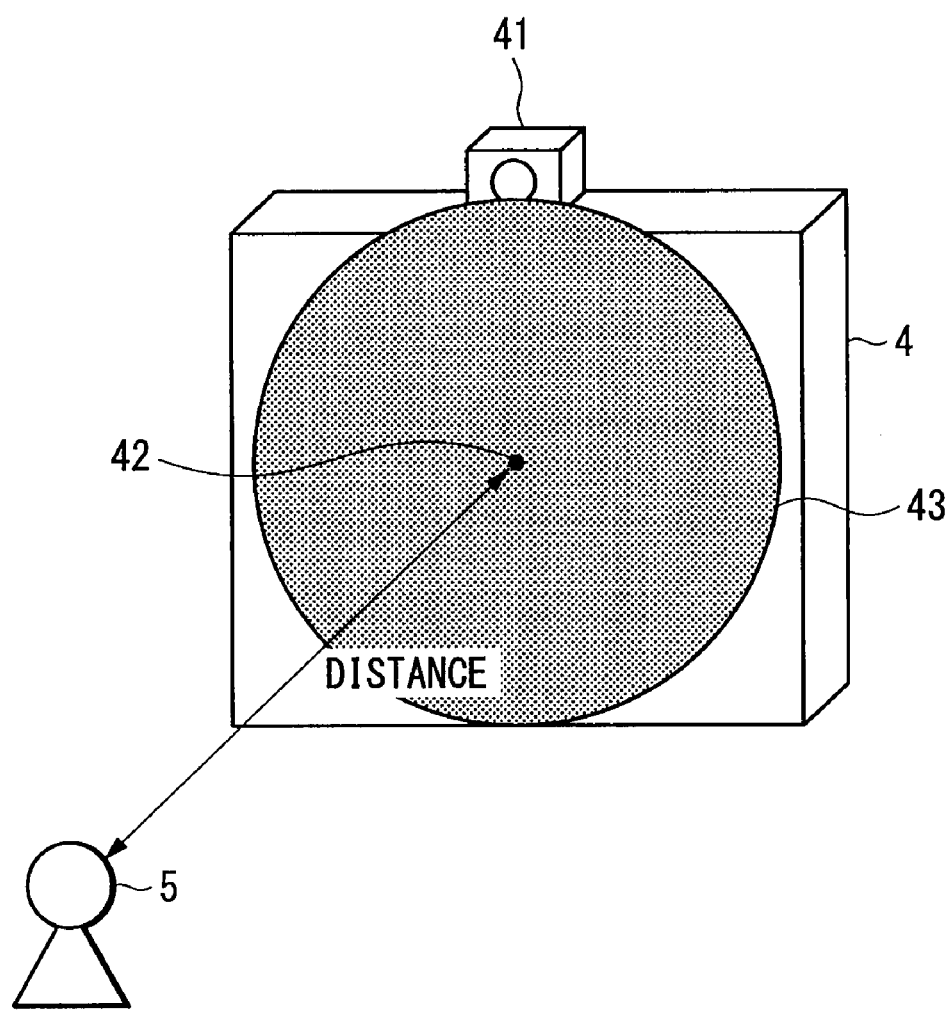
FIG. 4 is an explanation diagram illustrating an example of site-line detection according to an embodiment of the present invention.

FIG. 4 illustrates an example of sight-line detection by the sight-line detecting unit 16 of the present embodiment. As shown in FIG. 4, the display unit 4 for displaying a plurality of images is provided with a sensor 41 that detects the sight line of the user 5 who is looking at the display unit 4. The sensor 41 includes a camera (not shown) for detecting the direction of the pupils of the user 5, or the like, a device (not shown) for measuring the distance from the display unit 4 to the user 5, and so on. The sight-line detecting unit 16 determines the central point (hereinafter, referred to as a fixation point) 42 of the sight line of the user 5 who is looking at the display unit 4 based on the data from the sensor 41. The sight-line detecting unit 16 estimates a peripheral viewing field 43 based on the determined user's fixation point 42 to display the object, which is superimposed and displayed on the image of content, in the user's peripheral viewing field 43. A predetermined angle from the fixation point 42 is set in advance and the range of the predetermined view angle with the fixation point 42 as the center thereof is determined as the peripheral viewing field 43. Typically, the range of about ±30 degrees from the fixation point is desirable. Since the range of peripheral vision varies between individuals, a processing unit for measuring the viewing field of a user in advance may be provided for estimating the peripheral viewing field based on the result thereof.

Although the present embodiment is designed to display an object for the content displayed on a screen in the peripheral viewing field of the user, such object representing attribute may be displaced for all contents displayed on the display unit 4.

Next, the processing of the present embodiment will be described in detail.

Figure 5:
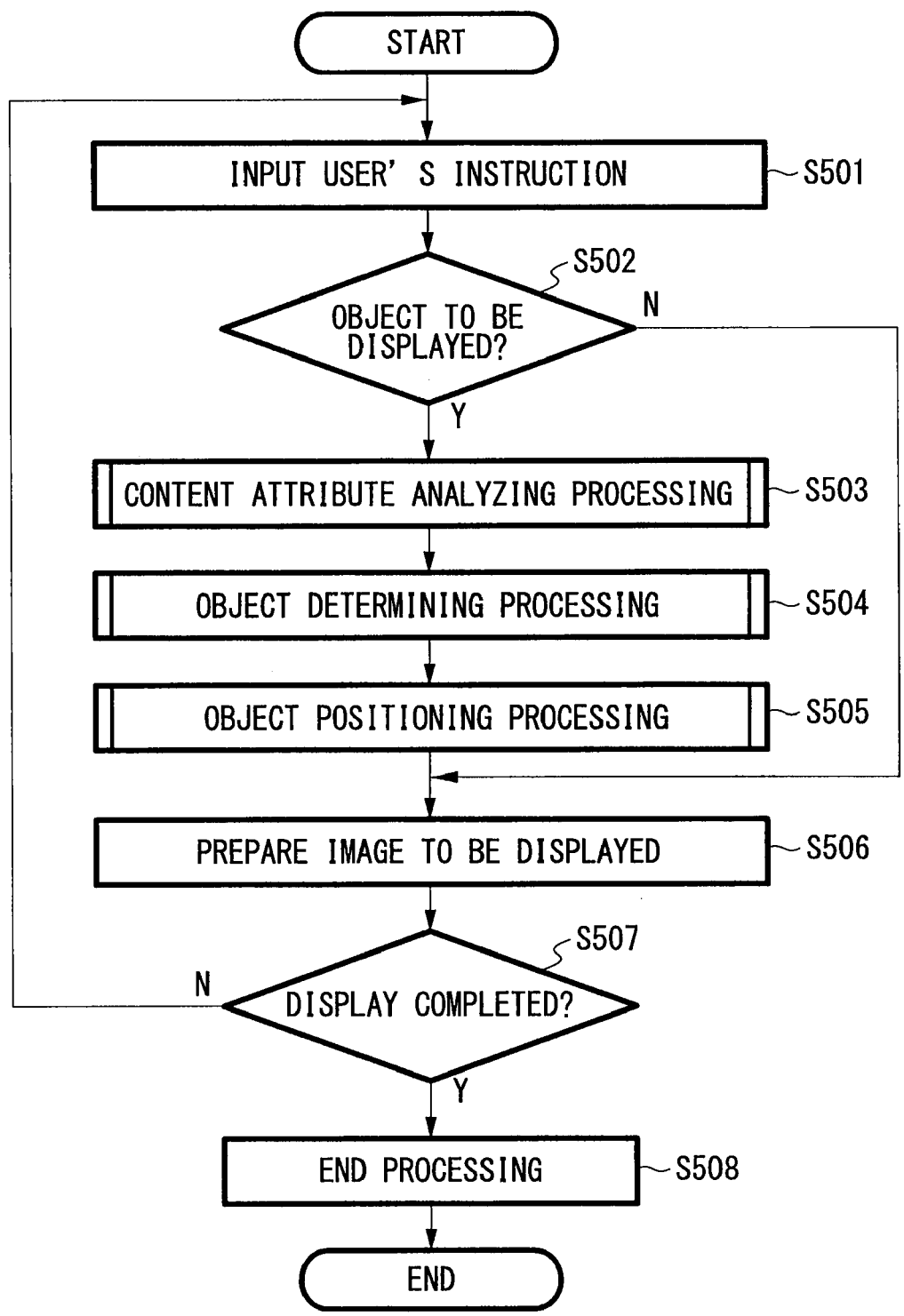
FIG. 5 is a flowchart that represents an example of processing of generating an image signal according to an embodiment of the present invention.

FIG. 5 illustrates a flowchart that represents an example of the processing of generating an image signal. First, data selected and instructed by the user using the input device 3, such as a remote controller, is input into the user instruction input unit 12 (Step S501). The data instructed by the user may be the type of content to be displayed on the display unit 4, the channel number of television broadcast, the presence or absence of the display of an object representing an attribute of the content, the classification for the content, and so on. Next, it is determined whether the object that represents the attribute of the content is displayed based on the instructed data input by the user (Step S502). As a result of the determination, if the object is displayed, then subsequent steps are carried out. If the object is not displayed, without proceeding to the subsequent steps, the processing proceeds to step S506.

Figure 6:
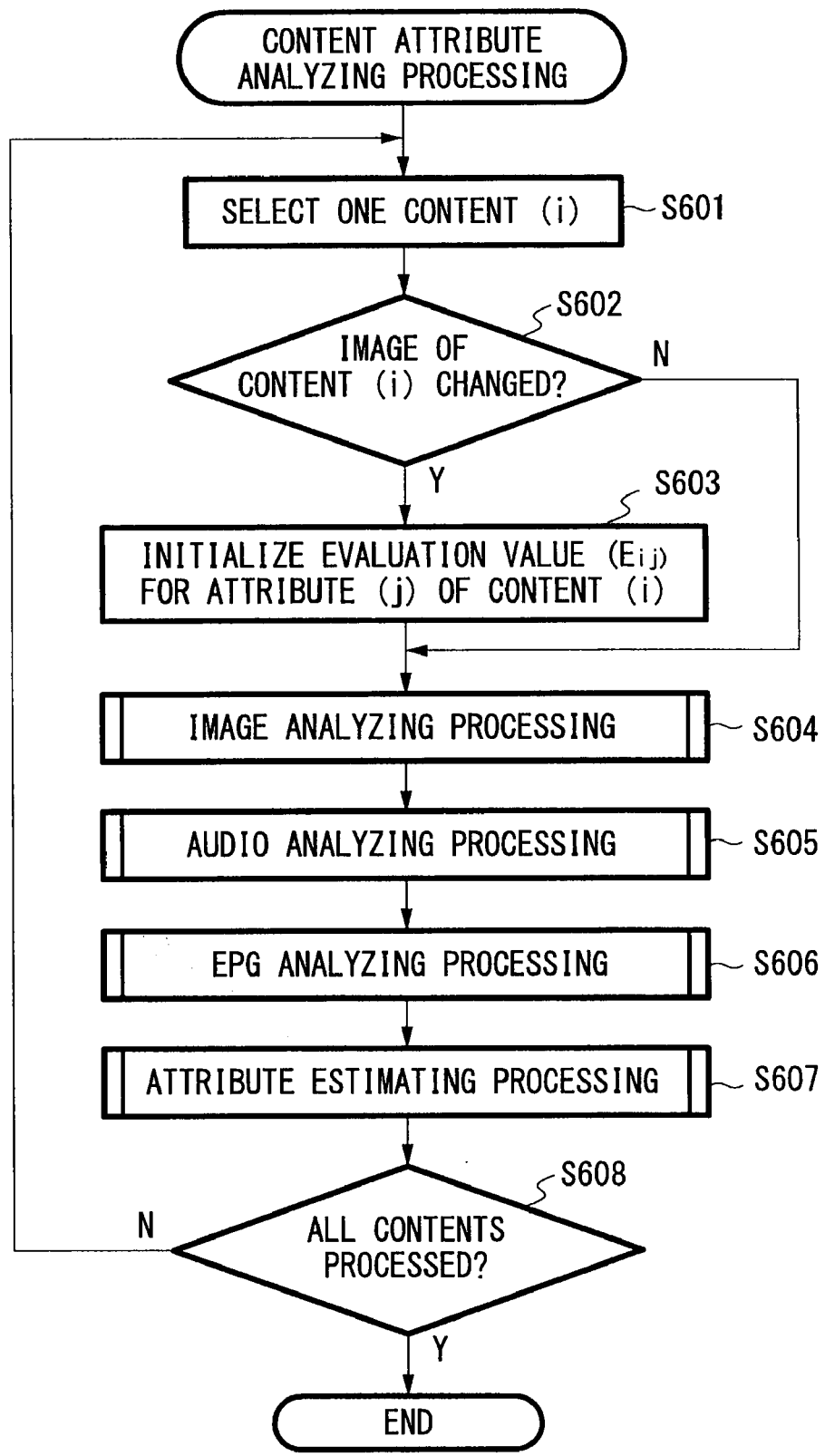
FIG. 6 is a flowchart that represents an example of processing of analyzing a content attribute according to an embodiment of the present invention.
Figure 11:
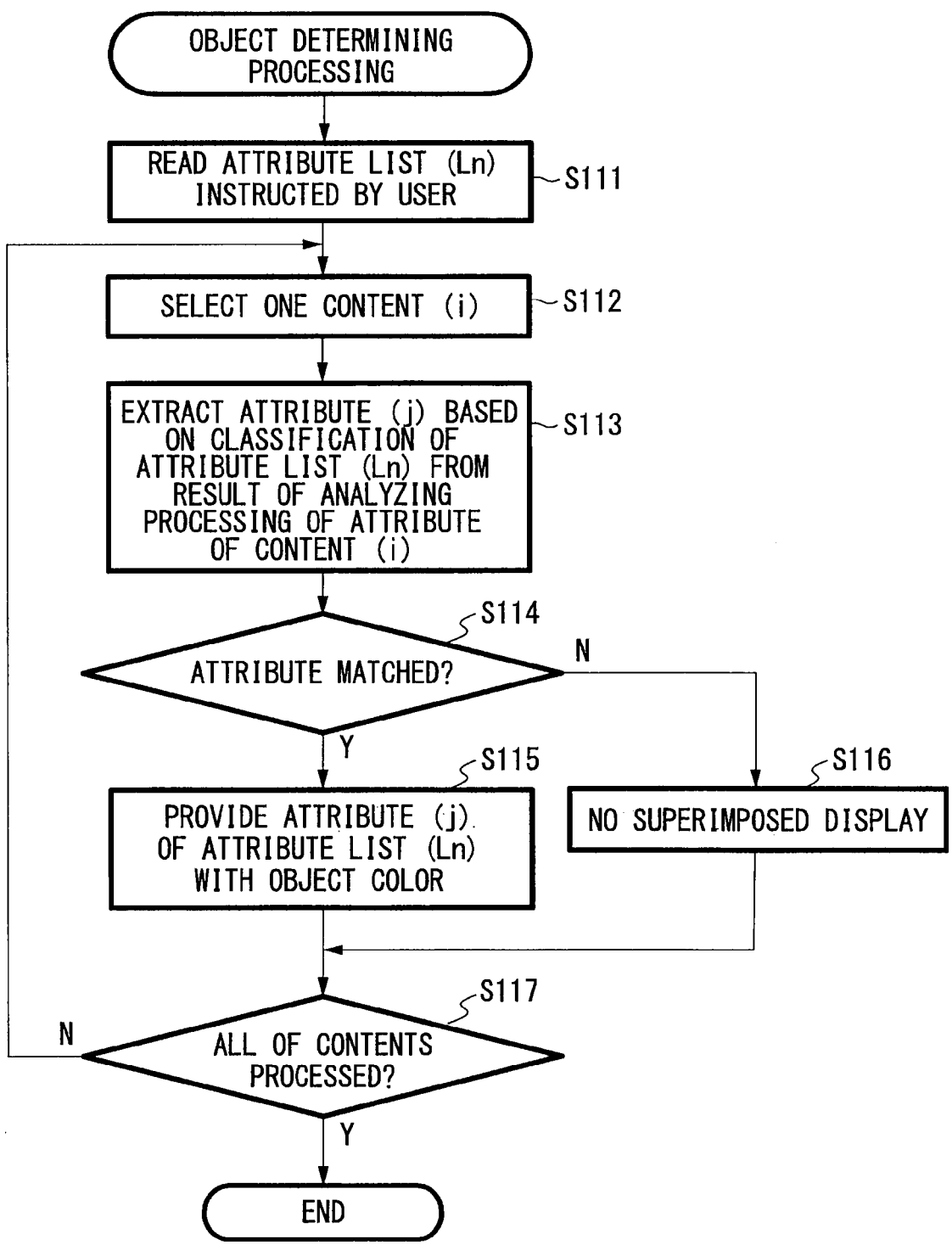
FIG. 11 is a flowchart that represents an example of processing of determining an object according to an embodiment of the present invention.
Figure 12:
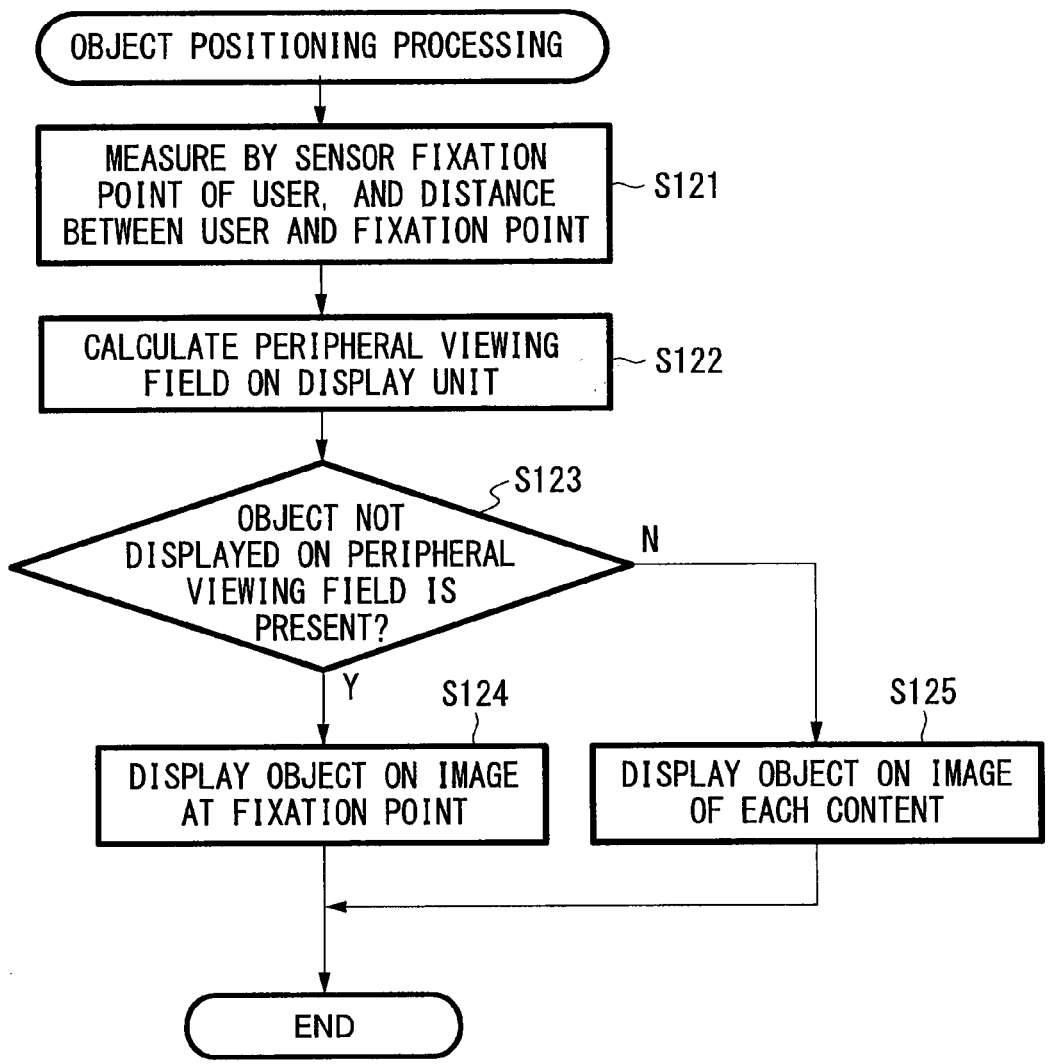
FIG. 12 is a flowchart that represents an example of processing of positioning an object according to an embodiment of the present invention.

If the object is displayed, then the processing of analyzing the attribute of a content (content attribute analyzing processing) is carried out by the content attribute analyzing unit 13 based on both the image data acquired by the image data acquiring unit 11 and the classification of the content instructed by the user (Step S503). FIG. 6 illustrates the details of the content attribute analyzing processing. Next, the image processing unit 14 carries out the processing of determining an object (object determining processing) based on the results of the content attribute analyzing processing (Step S504). FIG. 11 illustrates the details of the object determining processing. Next, the display-image producing unit 15 carries out the processing of positioning the object (object positioning processing) based on the result of sight-line detection by the sight-line detecting unit 16 (Step S505). FIG. 12 illustrates the object positioning processing in detail. Subsequently, the display-image producing unit 15 creates an image to be displayed by superimposing a colored object on an image signal acquired by the image data acquiring unit 11 at the display position determined in step S505 (Step S506). If it is determined in step S502 that the user's instruction does not include object display instruction, the processing of superimposing an object is not carried out. Thus, a usual display image is generated.

Finally, the instruction data is acquired from the user. It is determined whether an instruction for terminating the display is provided (Step S507). If there is the instruction for terminating the display as a result of the determination, then the processing is terminated (Step S508). If there is no instruction for terminating the display, then the processing returns to the first step S501 and repeats the steps.

As described above, until the input of user's instruction of terminating the processing, the image signal generating processing of the present embodiment repeats the steps in a predetermined cycle according to the user's instruction.

FIG. 6 illustrates a flowchart representing an example of content attribute analyzing processing in step S503 in FIG. 5. In the content attribute analyzing processing, one content is selected from the target contents for the attribute analyzing (Step S601). Next, it is determined whether an image of the selected content (i) is changed (Step S602). If the image of the content (i) has been changed, an evaluation value ($E_{ij}$) with respect to a variable (j) representing an attribute of the content (i) is initialized (Step S603). Here, in the content attribute analyzing processing, an evaluation value ($E_{ij}$) represents a degree of coincidence between the characteristics of the target content and each classification item according to the user-instructed classification, such as each item of broadcast program. Subsequently, the attribute analyzing processing is repeated for images of the content (i) and the evaluation values for each classification item are added up. If the evaluation value ($E_{ij}$) exceeds a predetermined value, then it is determined that the content is classified into the corresponding classification item. Therefore, if the image of the content has been changed, then evaluation value for the attribute of each classification item is initialized. On the other hand, if the image of the content is not changed, then the processing proceeds without initialization.

Next, in the content attribute analyzing processing, image analyzing processing (Step S604), audio analyzing processing (Step S605), and EPG analyzing processing (Step S606) are carried out, respectively. Then, the attribute estimating processing on the content (i) is carried out (Step S607). The details of each processing will be described later. Finally, it is determined whether the analyzing processing for all the contents has been carried out (Step S608). If there are unprocessed contents, the processing returns to step S601 and then repeats the steps. If the analyzing processing for all the contents has been completed (Step S608), then the processing is ended.

Figure 7:
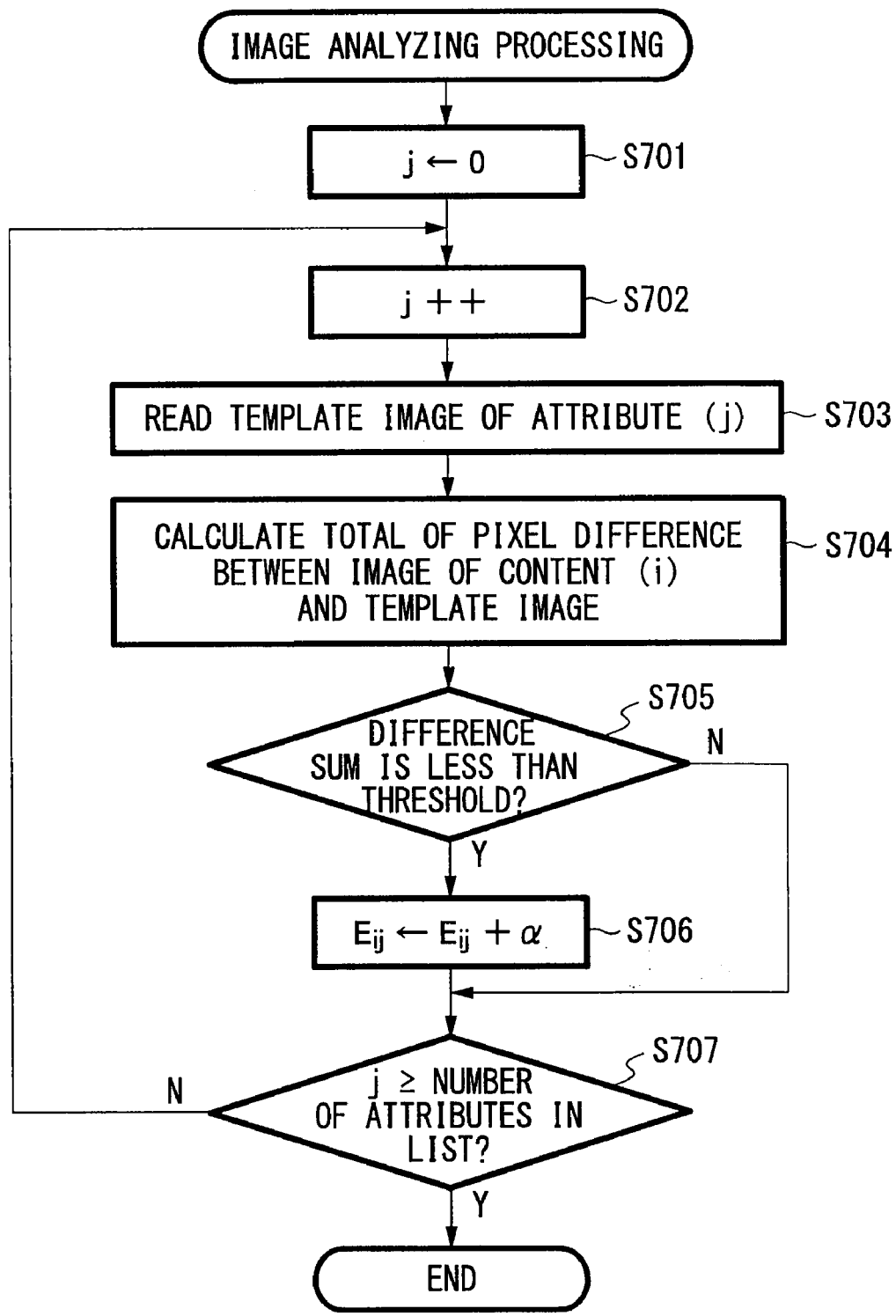
FIG. 7 is a flowchart that represents an example of processing of analyzing an image according to an embodiment of the present invention.

FIG. 7 illustrates a flowchart representing an example of image analyzing processing in step S604 in FIG. 6. In the image analyzing processing, the image data of content (i) selected in the content attribute analyzing processing as shown in FIG. 6 is input and the image data is matched with a template image, thereby analyzing the attribute thereof.

First, a variable (j) that represents an attribute is initialized (Step S701). Next, the initialized variable (j) is incremented by one (Step S702) and the template image of the attribute is then read out from the template data 17 (Step S703). Subsequently, a pixel value of content (i) is compared with a pixel value of the template image and the total difference thereof is calculated (Step S704). Next, it is determined whether the total difference is less than a threshold (Step S705). If it is less than the threshold, then an evaluation value (α) is added to an evaluation value ($E_{ij}$) of the variable (j) of content (i) (Step S706). As a result of the determination, if the total difference exceeds the threshold, then the evaluation value ($E_{ij}$) is not updated. Finally, it is determined whether the variable (j) that represents the attribute is larger than the number of attributes in an attribute list corresponding to the user-instructed classification (Step S707). If it is larger than the number of attributes, the analyzing processing for all attributes has been completed and the processing is therefore completed. As a result of the determination, if the variable (j) is smaller than the number of attributes, then the processing returns to step S702 and the processing is repeated on the next attribute.

As a result of the above image analyzing processing, the evaluation value ($E_{ij}$) for each attribute is updated based on the image data of the selected content (i).

Furthermore, in the present processing, the matching processing is carried out between the image data of content (i) and the template image such that pixels in a target frame of the content (i) is compared with pixels of the template image and the difference thereof is extracted. Alternatively, the matching may be carried out with any other processing. For example, the coincidence between them may be calculated by making a comparison between the histograms of luminance of the images.

Figure 8:
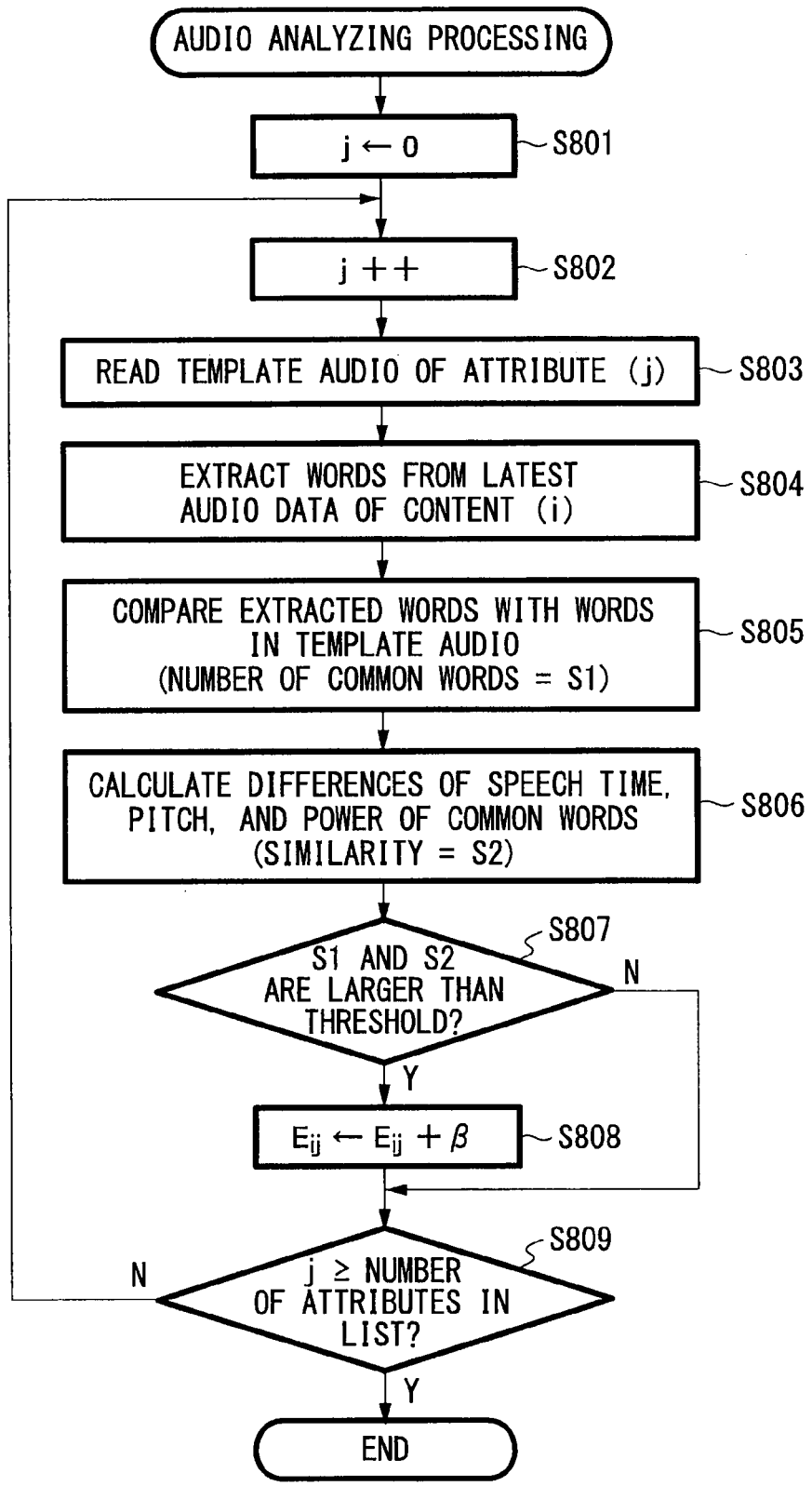
FIG. 8 is a flowchart that represents an example of processing of analyzing audio according to an embodiment of the present invention.

FIG. 8 illustrates a flowchart that represents an example of audio analyzing processing in step S605 in FIG. 6. In the audio analyzing processing, the audio data added to the content (i) selected in the content attribute analyzing processing shown in FIG. 6 is input and the audio data is matched with a template audio, thereby analyzing the attribute thereof.

First, a variable (j) that represents an attribute is initialized (Step S801). Next, one is added to the variable (j) (Step S802), and the template audio of an attribute (j) is read from template data 17 (Step S803). Next, words are extracted from the latest audio data of content (i) (Step S804). In this example, the word extraction is carried out by estimating the words based on the HMM-based speech recognition and extracting recognizable words from the audio data in a latest predetermined period of time. Alternatively, it may be carried out in different ways. Subsequently, the words extracted from the content (i) are compared with the words in the read template audio and the number of common words is calculated (Step S805). Here, the calculated number of common words is set to S1. Next, for estimating the characteristics of the speech or pronunciation of common words, the duration, pitch, and speaking volume (power) are compared with the template audio. Subsequently, the difference thereof is calculated and the similarity thereof is then calculated (Step S806). The difference in duration of speech is represented as $Time_{diff}$, difference in pitch is represented as $Pitch_{diff}$, and difference in power is represented as $Power_{diff}$. Similarity S2 is obtained by multiplying the differences by the respective factors and combining them together. The similarity S2 is calculated by the following equation:

$$S2 = W_{time}Time_{diff} + W_{pitch}Pitch_{diff} + W_{power}Power_{diff}$$

Next, it is determined whether the number of common words S1 and the similarity S2 exceed predetermined thresholds respectively set in advance (Step S807). If both of S1 and S2 are larger than the respective thresholds, then an evaluation value (β) is added to the evaluation value ($E_{ij}$) with respect to a variable (j) representing the attribute of content (i) (Step S808). As a result of the determination, if S1 or S2 is smaller than the threshold, then the evaluation value ($E_{ij}$) is not updated. Finally, it is determined whether the variable (j) that represents attribute is larger than the number of attributes in the attribute list corresponding to the user-instructed classification (Step S809). If it is larger than the number of attributes, the analyzing processing for all attributes has been completed and the processing is therefore completed. As a result of the determination, if the variable (j) is smaller than the number of attributes, then the processing returns to step S802 and the processing is repeated on the next attribute.

As a result of the above audio analyzing processing, the evaluation values ($E_{ij}$) for the respective attributes are updated based on the audio data of the selected content (i).

Note that, in this example, the matching between the audio data of content (i) and the template audio is carried out such that the number of common words and the characteristics of speech or pronunciation are estimated and the similarity thereof is then determined therefrom. Alternatively, however, the matching may be carried out in a different way. For example, feeling or the like is estimated from the characteristics of speech or pronunciation, the matching is carried out based on the estimated feeling or the like, and the coincidence thereof is then calculated.

Figure 9:
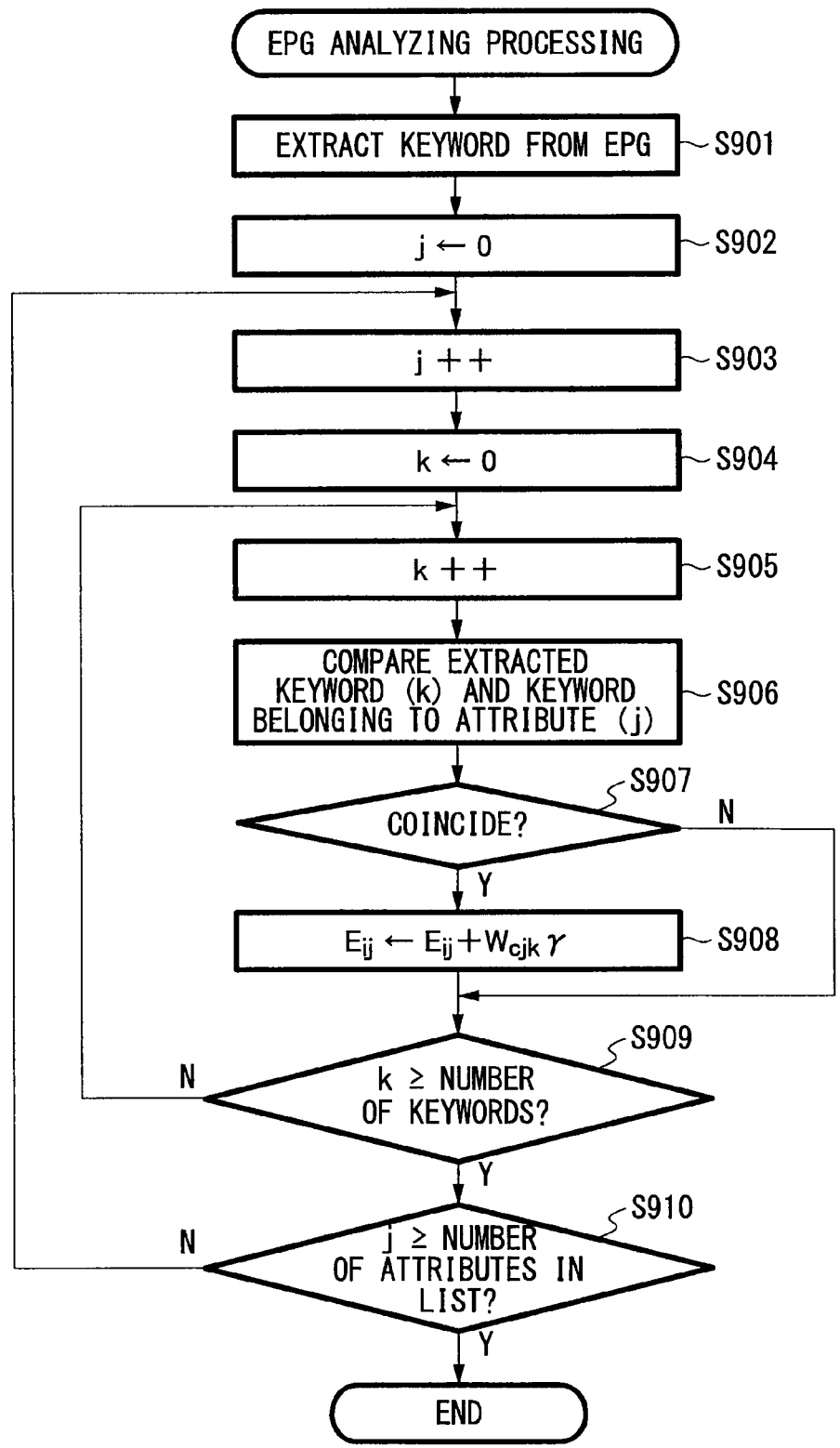
FIG. 9 is a flowchart that represents an example of processing of analyzing an EPG according to an embodiment of the present invention.

FIG. 9 illustrates a flowchart representing an example of EPG analyzing processing in step S606 in FIG. 6. In the EPG analyzing processing, program data added to the content (i) selected in the content attribute analyzing processing shown in FIG. 6 is input and the program data is subjected to matching with a keyword registered for each attribute.

First, keyword is extracted from the program data of content (i) (Step S901). The program data of EPG or the like is searched and words of the program title, subtitle, performer names, comments of other matters, and so on are extracted as the keyword. Next, a variable (j) that represents an attribute is initialized (Step S902). Next, one is added to the variable (j) (Step S903). Next, a variable (k) that represents the keyword is initialized (Step S904). Next, one is added to the variable (k) (Step S905). Subsequently, keyword belonging to the attribute (j) is read from the template data 17 and compared with the k-th keyword (k) extracted from the content (i) (Step S906). Subsequently, it is determined whether the keyword corresponding to the keyword (k) is present (Step S907). As a result of the determination, if there is the corresponding keyword, then an evaluation value ($W_{cjk}\gamma$) is added to the evaluation value ($E_{ij}$) of the attribute (j) of content (i) (Step S908). Here, the coefficient ($W_{cjk}$) by which the evaluation value ($E_{ij}$) is multiplied is defined for each keyword in advance. A plurality of keywords belongs to the attribute (j). However, these keywords have different degrees of expressing the characteristics of the attribute (j). Thus, there is a need of assign different weights to the respective keywords when calculating the evaluation value of the attribute (j). Therefore, when calculating an evaluation value, on the basis of the keyword of the attribute (j) corresponding to the keyword from the content (i), the evaluation value is updated by multiplying the keyword by the coefficient. As a result of the determination in Step S907, if the keyword is unmatched, the evaluation value is not updated.

Next, it is determined whether the variable (k) is larger than the number of the extracted keywords (Step S909). If the variable (k) is larger than the number of the keywords, the processing proceeds to the next step because the processing for the attribute (j) with respect to all keywords extracted from the content (i) is completed. As a result of the determination, if the variable (k) is smaller than the number of keywords, there is a keyword which is not yet processed. Therefore, the processing returns to step S905 and is repeated for the next keyword. Next, it is determined whether the variable (j) representing attribute is larger than the number of attributes in the attribute list corresponding to the classification instructed by the user (Step S910). If it is larger than the number of attributes, the processing is ended because the analyzing processing is completed for all attributes. As a result of the determination, if the variable (j) is smaller than the number of attributes, then the processing returns to step S903 and the steps are then repeated for the next attribute.

As a result of the above EPG analyzing processing, the evaluation value ($E_{ij}$) for each attribute is updated based on the program data of the selected content (i).

Thus, in the above description, the attribute can be comprehensively evaluated by accumulating evaluation values of the respective attributes after sequentially carrying out each of the image analyzing processing, the audio analyzing processing, and the EPG analyzing processing as content attribute analyzing processing. In the case where the content is classified by the user instruction based on program performers, single analyzing processing such as the EPG analyzing, or combined analyzing processing may be carried out.

Figure 10:
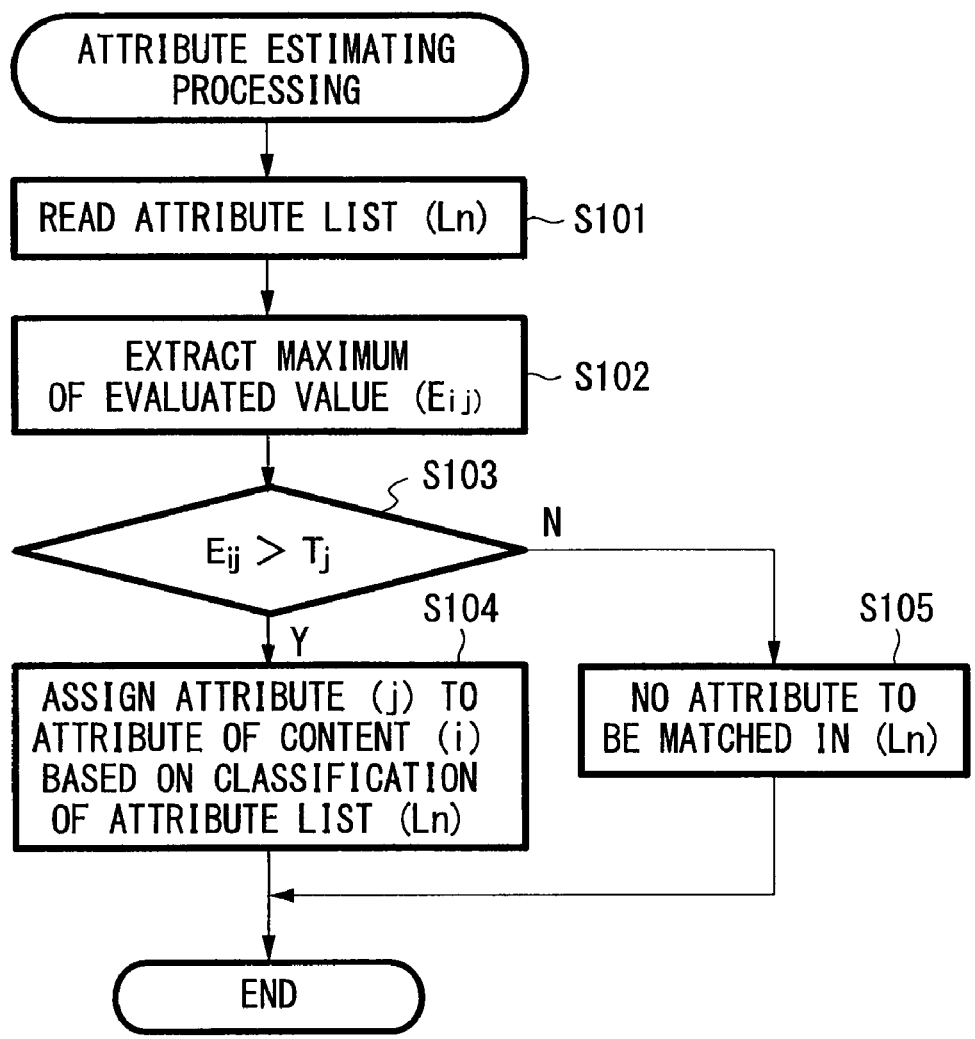
FIG. 10 is a flowchart that represents an example of processing of estimating an attribute according to an embodiment of the present invention.

FIG. 10 illustrates a flowchart representing an example of attribute estimating processing in step S607 in FIG. 6. In the attribute estimating processing, the attribute of content is estimated with reference to the results of the image analyzing processing, the audio analyzing processing, and the EPG analyzing processing as described above.

First, the data of an attribute list (Ln) corresponding to the classification instructed by the user is read from the attribute list 18 including a plurality of attribute lists (Ln) (Step S101). Next, with reference to an evaluation value for the attribute calculated in the analyzing processing with respect to the content (i), the maximum of the evaluation value ($E_{ij}$) of the attribute (j) based on the classification of the attribute list (Ln) is extracted (Step S102). Next, it is determined whether the extracted evaluation value ($E_{ij}$) is larger than a previously-defined threshold (Tj) (Step S103). As a result of the determination, if the evaluation value ($E_{ij}$) is larger than the threshold (Tj), then the attribute of the content (i) is set to the attribute (j) based on the classification of the attribute list (Ln) (Step S104). As the result of the determination, if the evaluation value ($E_{ij}$) is less than the threshold (Tj), then it is defined there is no matched attribute in the attribute list (Ln) (Step S105).

As described above, the content attribute analyzing processing in the content attribute analyzing unit 13 analyzes the attribute of a content (i) and determines the attribute in the attribute list to which the content (i) belongs. As a result, the attribute of the content can be classified. Note that, immediately after the content has been changed, there is insufficient accumulation of evaluation values with respect to each attribute. Thus, the attribute may not be classified. However, the processing according to the present embodiment can be performed repeatedly to accumulate evaluation values, thereby allowing the classification to be correctly carried out.

FIG. 11 illustrates a flowchart that represents an example of object determining processing in step S504 in FIG. 5. In the object determining processing, the image processing unit 14 determines an object to be superimposed on the image of content and displayed based on the results of the attribute analyzing by the content attribute analyzing unit 13.

First, the data about the attribute list (Ln) corresponding to the classification instructed by the user is read from the attribute list 18 (Step S111). Next, one of the contents is selected (Step S112). Subsequently, the attribute (j) in the attribute list (Ln) of the selected content (i) is extracted based on the results of the attribute analyzing on the content (i) (Step S113). Subsequently, it is determined whether there is an attribute matched with the content (i) (Step S114). As a result of the determination, if there is a matched attribute, the read attribute list (Ln) is referenced and a color defined for the corresponding attribute (j) is provided as an object color of the content (i) (Step S115). For example, the list 2 in the attribute list 18 is selected. If the attribute (j) of the content (i) is a "quiz program", then the color of the object is yellow.

As a result of the determination in step S114, if there is no matched attribute, then there is no superimposed display of an object with reference to the content (i) (Step S116). Finally, it is determined whether all of the contents are subjected to the processing (Step S117). If there are remaining contents, the processing returns to step S112 and the steps are repeated. As a result of the determination, if all of the contents have been subjected to the processing, then the processing is ended.

FIG. 12 illustrates a flowchart representing an example of object positioning processing in step S505 in FIG. 5. In the object positioning processing, the display position of an object superimposed and displayed on the content, which is determined in the object determining processing, is determined based on the peripheral viewing field of the user. This processing includes the steps of calculating the peripheral viewing field 43 of the user based on the data acquired by the sight-line detecting unit 16 using the sight-line detecting sensor 41 and determining the display position of an object in the display-image producing unit 15 based on the data.

First, the sight-line detecting unit 16 acquires the position of the fixation point 42, which is detected by the sensor 41, and the distance between the user 5 and the fixation point 42, which is measured by the sensor 41 (Step S121). Next, the peripheral viewing field 43 of the user 5 on the display unit 4 is calculated based on the data about the position of the fixation point 42 and the data about the distance between the user 5 and fixation point 42 (Step S122). Next, the display-image producing unit 15 determines whether there is an object which may not be displayed on the peripheral viewing field 43 based on the peripheral viewing field 43 calculated by the sight-line detecting unit 16 (Step S123). Here, an object to be superimposed and displayed on the content is of a predetermined display mode, such as a frame of a screen or a symbol with a specific shape. Furthermore, it is determined whether the object of the mode can be displayed in the peripheral viewing field 43, if the object is displayed at a predetermined position which is determined in advance. For example, if a screen frame is designated as the display mode of the object, it is determined that the object can be displayed so long as part of the frame is located within the peripheral viewing field 43. If there is a screen frame entirely located outside the peripheral viewing field 43, then it is determined that there is an object that may not be displayed within the peripheral viewing area 43.

As a result of the determination in step S123, if there is an object that may not be displayed in the peripheral viewing field 43, then the object display position is shifted so that all of the objects can be displayed in an image on the screen where the fixation point 42 is located (Step S124). Here, for example, in the case where an object displayed is a symbol with a specific shape, the object is arranged on a line connecting the fixation point 42 and the image of each content. Subsequently, the object is moved to the position in the image of content located including the fixation point 42, followed by being superimposed and displayed. The processing of displaying an object being shifted into the peripheral viewing field 43 of the user 5 is not limited to the above description. Alternatively, any other processing may be employed. As a result of the determination in step S123, if all of the objects can be displayed in the peripheral viewing field 43, then the object is displayed on each image of content (Step S125).

The object to be superimposed and displayed on the content may need to represent the attribute of the content and be readily identified by the user. Therefore, according to this embodiment, color data is used. The color data can be recognized even in the user's peripheral viewing field, and the user may not need to discriminate a fine pattern or the like. Accordingly, the object can be recognized at a glance. Thus, in this embodiment, colored objects corresponding to the attributes of the contents are used. For example, the objects may be provided as frames on the periphery of the respective screens on the display unit, and the frames may be displayed with different colors, respectively. In addition, symbols with specific shapes which can be readily identified may be displayed with different colors on part of the content being displayed. Such object display mode to be used is determined in advance. Alternatively, the user may select any one of a plurality of display modes.

Figure 13:
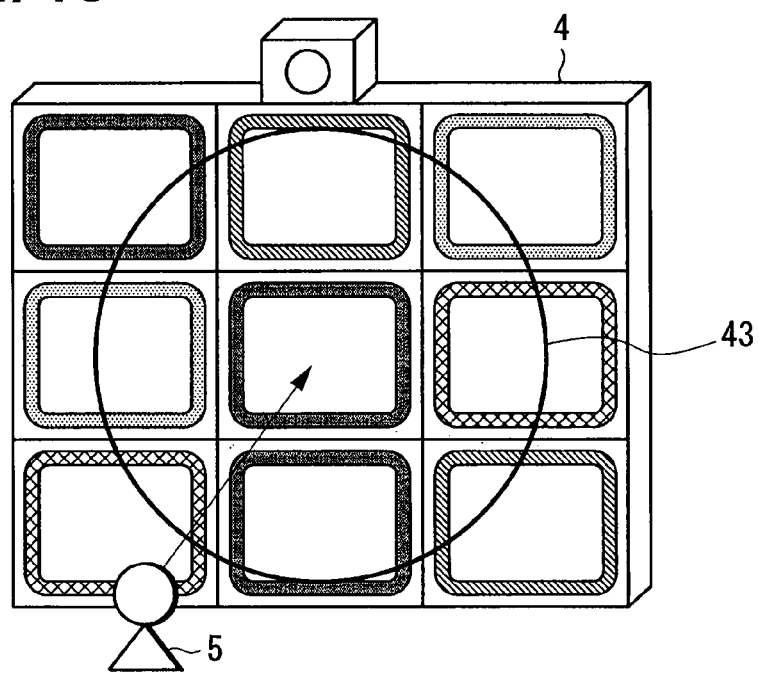
FIG. 13 is an explanation diagram illustrating an example (1) of object representation according to an embodiment of the present invention.

FIG. 13 illustrates an example of displaying the images of contents and objects respectively on the display unit 4 having nine displays. In other words, FIG. 13 shows an example in which the attributes of the contents are represented by the frame colors of the respective screens. Here, a user's fixation point is in a central image. Part of the objects (here respective frames) for all of the contents is displayed in the user's peripheral viewing field 43.

Figure 14:
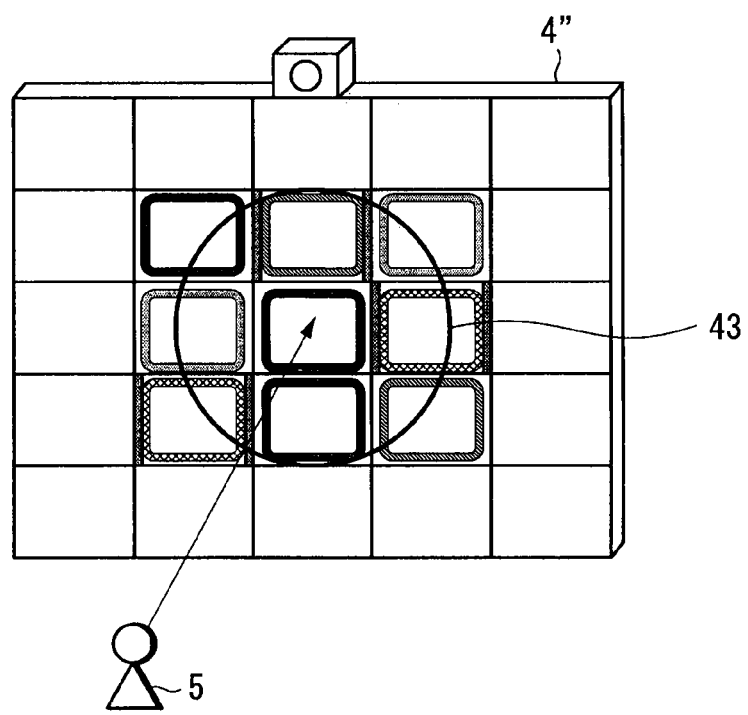
FIG. 14 is an explanation diagram illustrating an example (2) of object representation according to an embodiment of the present invention.

FIG. 14 illustrates an example of displaying the images of contents and objects on a display unit 4" having 25 displays. In FIG. 14, the attribute of content is represented by the frame color of a screen in a manner similar to FIG. 13. In this case, however, an object is displayed with respect to the image of content displayed on a display located in the user's peripheral viewing field 43. In contrast, an object is not displayed with respect to the content displayed on a display located outside the user's peripheral viewing field 43. Thus, the objects may be displayed on some contents displayed on the display unit 4".

Figure 15:
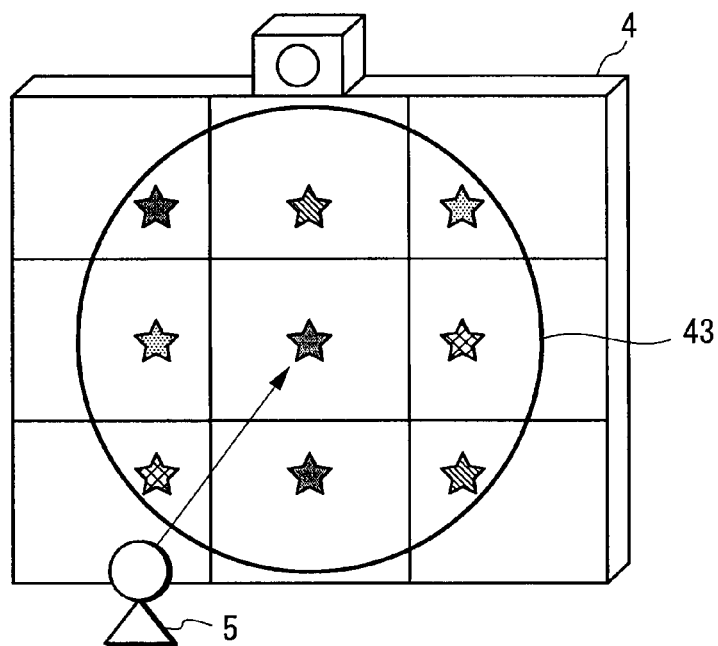
FIG. 15 is an explanation diagram illustrating an example (3) of object representation according to an embodiment of the present invention.

FIG. 15 illustrates an example of displaying objects of other display mode than a screen frame on the display unit 4 having nine display devices. In other words, FIG. 15 shows an example of display mode in which objects have a specific shape (here, star shape) with different colors. Here, for allowing a star-shaped object to be displayed in the user's peripheral viewing field 43, objects corresponding to the respective contents are arranged at certain positions on the images of the contents so that the objects can be included in the peripheral viewing field 43. Therefore, the object of content displayed on the central display device, where the user's fixation point is located, is arranged at the center of an image. In contrast, for example, the object of content displayed on the display located above the central display is located at the lower part of the corresponding image. Thus, when the objects are symbols with a specific shape or the like, the symbols may be placed at positions in the images of the respective contents and within the user's peripheral viewing field 43. Therefore, the user is allowed to recognize the objects without any difficulty.

Figure 16:
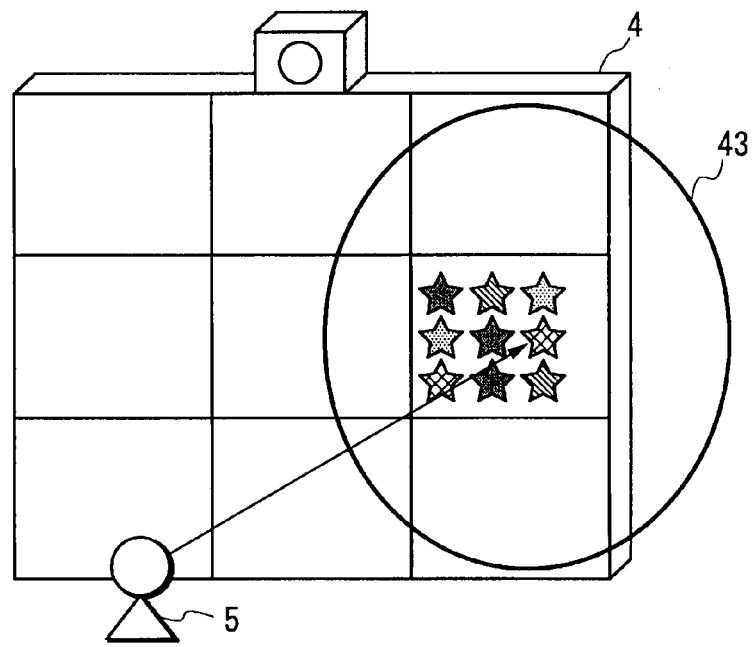
FIG. 16 is an explanation diagram illustrating an example (4) of object representation according to an embodiment of the present invention.

FIG. 16 illustrates an example of displaying star-shaped objects on the display unit 4 having nine displays in a manner similar to FIG. 15, where the user's fixation point is shifted from the position shown in FIG. 15 to the position shown in FIG. 16. In other words, in FIG. 15, the user's fixation point is located almost at the center of the display unit 4, or within the center display. In FIG. 16, the user's fixation point is shifted to the display on the display located in the middle of the right side of the display unit 4. In this way, when the user's fixation point is moved while objects being arranged on the images of the respective contents, the objects may be located outside the range of the user's viewing field and the colors thereof may be difficult to be recognized by the user's peripheral vision. Therefore, the object is arranged on a straight line that extends from the fixation point to each of the images. That is, the object is arranged so that the positional relationship of the respective images and the positional relationship of objects corresponding to the respective images can be retained. In this example, therefore, the objects can be moved to be displayed on the image where the fixation point is located.

As described above, there are a variety of objects that represent the attribute of contents, so that other display mode than those described above may be used. The outline of each content can be recognized quickly by representing the object on the position which can be recognized by the user's peripheral vision on the basis of both the user's fixation point and the peripheral viewing field thereof. In addition, the user can readily search the target content, reducing a trouble of failing to take data.

Furthermore, the configuration of the image signal generating apparatus shown in FIG. 1 includes the processing unit for carrying out the processing of the present embodiment. Alternatively, a computer program (software) for carrying out the same processing as that of the processing unit may be prepared and installed in a data processing system, such as a computer system. Accordingly, the data processing system may function as an image signal generating apparatus. The computer program to be installed in the computer system or the like may be distributed by being stored (recorded) in any kind of recording media. Alternatively, it may be distributed through any of transmission media, such as the Internet.

The present application contains subject matter related to that disclosed in Japanese Priority Patent Application JP 2008-099567 filed in the Japanese Patent Office on Apr. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal generating apparatus, comprising:
a sight-line detecting unit that detects a sight line of a user when the user is looking at a plurality of contents displayed on a display unit;
a peripheral image determination unit that determines a plurality of peripheral contents located in a user's peripheral viewing field based on the sight line detected by the sight-line detecting unit, each of the plurality of peripheral contents having a respective image signal; and
an image processing unit that adds, to each image signal, an object representing an attribute of a respective one of the plurality of peripheral contents determined by the peripheral image determination unit.

2. The image signal generating apparatus according to claim 1, wherein
the image processing unit displays the objects in the peripheral viewing field with the sight line detected by the sight-line detecting unit at the center thereof.

3. The image signal generating apparatus according to claim 2, further comprising:
an attribute analyzing unit that analyzes the attribute of the respective one of the plurality of peripheral contents based on an amount of characteristics of the respective one of the plurality of peripheral contents displayed on the display unit, wherein
the image processing unit determines the object based on the attribute of the respective one of the plurality of peripheral contents analyzed by the attribute analyzing unit and adds the object to the respective image signal.

4. The image signal generating apparatus according to claim 3, wherein
the amount of characteristics of the respective one of the plurality of peripheral contents analyzed by the attribute analyzing unit is extracted by comparing a pixel value of an image of the respective one of the plurality of peripheral contents with a pixel value of a template image used for attribute analyzing.

5. The image signal generating apparatus according to claim 3, wherein
the amount of characteristics of the respective one of the plurality of peripheral contents analyzed by the attribute analyzing unit is extracted by comparing a luminance histogram of an image of the respective one of the plurality of peripheral contents with a luminance histogram of a template image used for attribute analyzing.

6. The image signal generating apparatus according to claim 3, wherein
the amount of characteristics of the respective one of the plurality of peripheral contents analyzed by the attribute analyzing unit is extracted by analyzing an audio signal added to the respective one of the plurality of peripheral contents and a template audio signal used for attribute analyzing and comparing extracted words.

7. The image signal generating apparatus according to claim 3, wherein
the amount of characteristics of the respective one of the plurality of peripheral contents analyzed by the attribute analyzing unit is extracted by comparing a word extracted from program data added to the respective one of the plurality of peripheral contents with a word used for attribute analyzing.

8. The image signal generating apparatus according to claim 3, wherein
the object added to the respective image signal in the image processing unit is a colored object with a color corresponding to the attribute of the content analyzed by the attribute analyzing unit.

9. The image signal generating apparatus according to claim 1, further comprising:
a display unit that displays the respective image signal processed by the image processing unit.

10. A method of generating an image signal, the method comprising the steps of:
detecting a sight line of a user when the user is looking at a plurality of contents being displayed on a display unit;
determining a plurality of peripheral contents located in a user's peripheral viewing field based on the detected sight line, each of the plurality of peripheral contents having a respective image signal; and
adding, to each image signal, an object representing an attribute of a respective one of the determined plurality of peripheral contents.

11. A non-transitory computer-readable storage medium having a computer-readable program stored therein that when executed by a computer causes the computer to perform a method, the method comprising:
detecting a sight line of a user when the user is looking at a plurality of contents being displayed on a display unit;
determining a plurality of peripheral contents located in a user's peripheral viewing field based on the detected sight line, each of the plurality of peripheral contents having a respective image signal; and
adding, to each image signal, an object representing an attribute of a respective one of the determined plurality of peripheral contents.

* * * * *